(12) United States Patent
Fang et al.

(10) Patent No.: US 12,101,207 B2
(45) Date of Patent: Sep. 24, 2024

(54) COMMUNICATION APPARATUS AND ASSOCIATED METHOD

(71) Applicant: REALTEK SEMICONDUCTOR CORPORATION, Hsinchu (TW)

(72) Inventors: Te Lung Fang, Hsinchu (TW); Chih Chieh Yen, Hsinchu (TW); Jen-Hao Yeh, Hsinchu (TW); Wei-Yi Wei, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 18/186,180

(22) Filed: Mar. 19, 2023

(65) Prior Publication Data

US 2023/0308313 A1 Sep. 28, 2023

(30) Foreign Application Priority Data

Mar. 22, 2022 (TW) .................................. 111110645

(51) Int. Cl.
*H04L 25/02* (2006.01)
(52) U.S. Cl.
CPC ................................ *H04L 25/0272* (2013.01)
(58) Field of Classification Search
CPC . H04B 1/38; H04B 1/40; H04B 1/401; H04B 1/44; H04B 3/20; H04B 3/28; H04B 3/30; H04L 25/026; H04L 25/0264; H04L 25/0272; H04L 25/028; H04L 25/03; H04L 25/03006

USPC ....... 375/219, 220, 257, 262, 265, 340, 341, 375/354, 356; 330/252, 257, 288; 455/78, 83
See application file for complete search history.

(56) References Cited

U.S. PATENT DOCUMENTS

| | | |
|---|---|---|
| 5,257,287 A | 10/1993 | Blumenthal et al. |
| 6,865,231 B1 | 3/2005 | Bunton et al. |

(Continued)

OTHER PUBLICATIONS

Office action of Taiwan counterpart application 111110645, Oct. 14, 2022.

(Continued)

*Primary Examiner* — Young T. Tse
(74) *Attorney, Agent, or Firm* — WPAT, P.C.; Anthony King

(57) ABSTRACT

A communication apparatus and an associated method are disclosed. The communication apparatus includes differential input ports; a signal pairing circuit, arranged for coupling the differential input ports to a receiving circuit, wherein when the signal pairing circuit operates in a first mode, a positive input port and a negative input port of the differential input ports correspondingly electrically couple to a positive input terminal and a negative input terminal of the receiving circuit, when the signal pairing circuit operates in a second mode, the positive input port and the negative input port of the differential input ports correspondingly electrically couple to the negative input terminal and the positive input terminal of the receiving circuit; a processor circuit, arranged for determining whether the decoded signal includes a specific code before the timer is time out and generating a determination result; and control the signal pairing circuit according to the determination result.

20 Claims, 2 Drawing Sheets

(56) References Cited

U.S. PATENT DOCUMENTS

| | | | |
|---|---|---|---|
| 2011/0194592 A1* | 8/2011 | Weng | H04L 25/0276 |
| | | | 375/220 |
| 2022/0182047 A1* | 6/2022 | Lee | H03K 5/003 |
| 2022/0190878 A1* | 6/2022 | Li | H04B 7/00 |

OTHER PUBLICATIONS

English abstract of the office action of Taiwan counterpart application 111110645, Oct. 14, 2022.
IEEE Standard for Ethernet, section three, clause 36, 2012.
IEEE Standard for Ethernet, section four, clause 49, 2012.

* cited by examiner

COMMUNICATION APPARATUS AND ASSOCIATED METHOD

CROSS-REFERENCE TO RELATED APPLICATIONS

This application claims priority of Taiwan application No. 111110645 filed on Mar. 22, 2022, which is incorporated by reference in its entirety.

TECHNICAL FIELD

The present application relates to communication, particularly to a communication apparatus and an associated method.

BACKGROUND

A differential signal pair can effectively improve the signal-to-noise ratio by representing a digital signal with a complementary voltage. However, when designing a transceiver circuit using a differential signal pair or a printed circuit board on which the transceiver circuit is located, care must be taken that the positive and negative terminals of a differential signal pair of the transceiver circuit are correctly electrically coupled to the positive and negative terminals of a differential signal pair of another transceiver. If the connection is reversed, the signal will not be received correctly, and the chip or the printed circuit board will need to be modified, thereby incurring additional costs. Therefore, the above-mentioned inconvenience has become an issue that needs to be addressed.

SUMMARY OF THE INVENTION

The present application provides a communication apparatus, including: differential input ports, configured to receive a differential signal from differential output ports of another communication apparatus via a transmission line; a signal pairing circuit, configured to electrically couple the differential input ports to a receiving circuit, wherein when the signal pairing circuit operates in a first mode, a positive input port and a negative input port of the differential input ports are correspondingly electrically coupled to a positive input terminal and a negative input terminal of the receiving circuit, and when the signal pairing circuit operates in a second mode, the positive input port and the negative input port of the differential input ports are correspondingly electrically coupled to the negative input terminal and the positive input terminal of the receiving circuit; the receiving circuit, configured to receive the differential signal to generate a received signal; a decoder circuit, configured to decode the received signal to generate a decoded signal; a processor circuit, configured to: reset a timer, determine whether the decoded signal includes a specific code before the timer is time out, and generate determination result; and selectively switch the signal pairing circuit from the first mode to the second mode or from the second mode to the first mode, according to the determination result.

The present application provides a method, for use in a communication apparatus, wherein differential input ports of the communication apparatus receive a differential signal from differential output ports of another communication apparatus via a transmission line, the method including: using a signal pairing circuit to electrically couple the differential input ports to a receiving circuit of the communication apparatus, wherein when the signal pairing circuit operates in a first mode, a positive input port and a negative input port of the differential input ports are correspondingly electrically coupled to a positive input terminal and a negative input terminal of the receiving circuit, and when the signal pairing circuit operates in a second mode, the positive input port and the negative input port of the differential input ports are correspondingly electrically coupled to the negative input terminal and the positive input terminal of the receiving circuit; using the receiving circuit to receive the differential signal to generate a received signal; using a decoder circuit to decode the received signal to generate a decoded signal; resetting a timer; determining whether the decoded signal includes a specific code before the timer is time out and generating a determination result; and selectively switching the signal pairing circuit from the first mode to the second mode or from the second mode to the first mode, according to the determination result.

With the present disclosure, the issue that the positive and negative terminals of a differential signal are reversely connected can be quickly identified and solved, which reduces the verification time and the cost of design modification in case of errors.

BRIEF DESCRIPTION OF THE DRAWINGS

Various aspects of the present application can best be understood upon reading the detailed description below and accompanying drawings. It should be noted that the various features in the drawings are not drawn to scale in accordance with standard practice in the art. In fact, the size of some features may be deliberately enlarged or reduced for the purpose of discussion.

DETAILED DESCRIPTION

Figure 1:
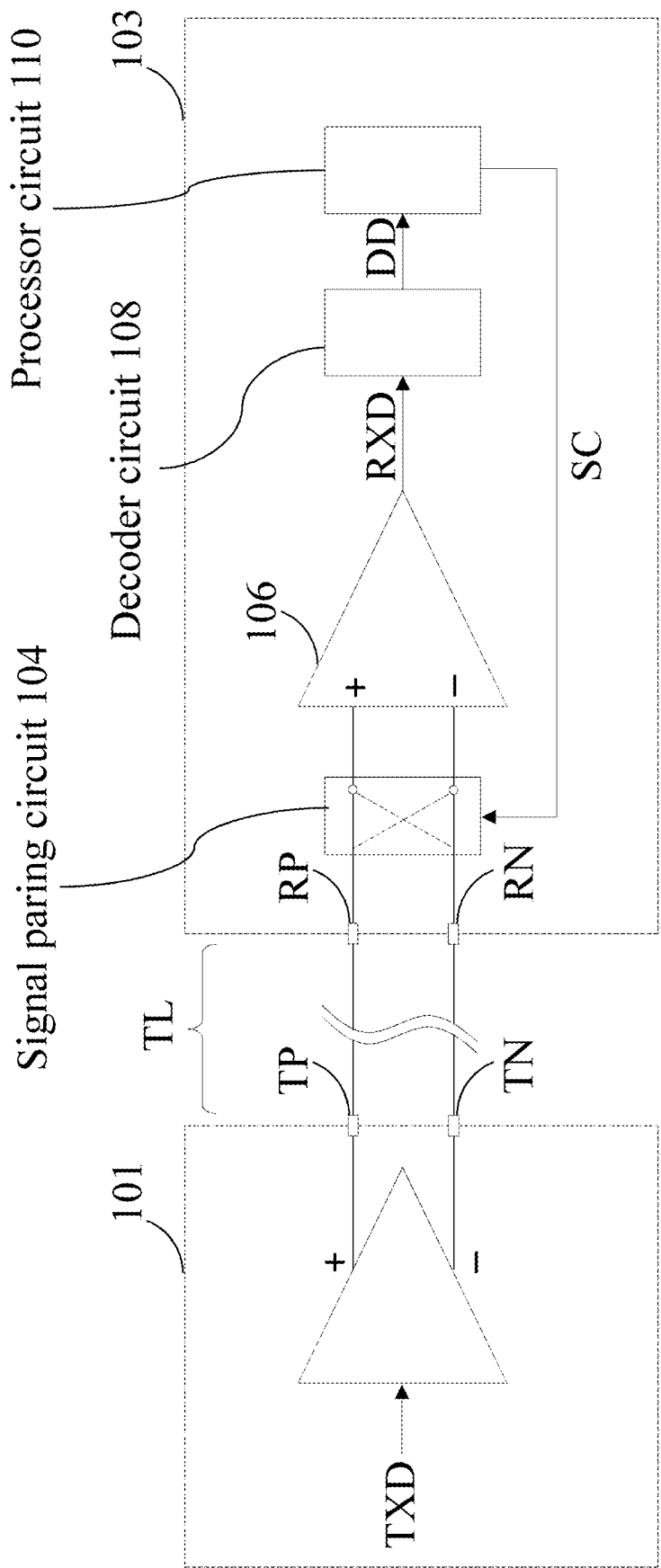
FIG. 1 is a schematic diagram of a communication apparatus according to one embodiment of the present disclosure.

FIG. 1 is a schematic diagram of a communication apparatus 103 according to one embodiment of the present disclosure. Differential input ports of the communication apparatus 103 is electrically coupled to differential output ports of another communication apparatus 101 via a transmission line TL to receive a differential signal. The differential input ports of the communication apparatus 103 includes a positive input port RP and a negative input port RN; the differential output ports of the communication apparatus 101 includes a positive output port TP and a negative output port TN. The transmission line TL can be the transmission lines on a printed circuit board or can be cables or other vias. Assuming that the positive input port RP and the negative input port RN are substantially electrically coupled to the negative output port TN and the positive output port TP, respectively, due to certain design errors of the transmission line TL, the communication apparatus 103 cannot correctively receive the data transmitted from the communication apparatus 101. Therefore, the present disclosure provides a signal pairing circuit 104 to solve this issue. It should be noted that, in addition to the transmission line TL, errors might also occur in the communication apparatus 101 or the communication apparatus 103, causing the positive input port RP and the negative input port RN to be substantially electrically coupled to the negative output port TN and the positive output port TP, respectively, and such errors can also be solved by the technical solution of the present disclosure.

The signal pairing circuit 104 of the communication apparatus 103 is electrically coupled between the differential input ports and a receiving circuit 106, and is configured to selectively operate in one of two modes according to control of the processor circuit 110. When the signal pairing circuit 104 operates in the first mode, the positive input port RP and the negative input port RN are correspondingly electrically coupled to a positive input terminal (+) and a negative input terminal (−) of the receiving circuit 106, when the signal pairing circuit 104 operates in a second mode, the positive input port RP and the negative input port RN are correspondingly electrically coupled to the negative input terminal (−) and the positive input terminal (+) of the receiving circuit 106. Therefore, no matter how the transmission line TL is designed, as long as the communication apparatus 103 finds that the positive input port RP and the negative input port RN are not substantially electrically coupled to the positive output port TP and the negative output port TN, the signal pairing circuit 104 can be used to swap the two signals inputted into the positive input port RP and the negative input port RN.

The receiving circuit 106 generates a non-differential received signal RXD according to the differential signal outputted by the signal pairing circuit 104. For example, the receiving circuit 106 can include an operational amplifier. The decoder circuit 108 is configured to decode the received signal RXD according to a communication protocol corresponding to the communication apparatus 103, to generate a decoded signal DD. The processor circuit 110 is configured to generate a control signal SC according to the decoded signal DD to control the signal pairing circuit 104; the detail of which is discussed below in connection with FIG. 2.

Figure 2:
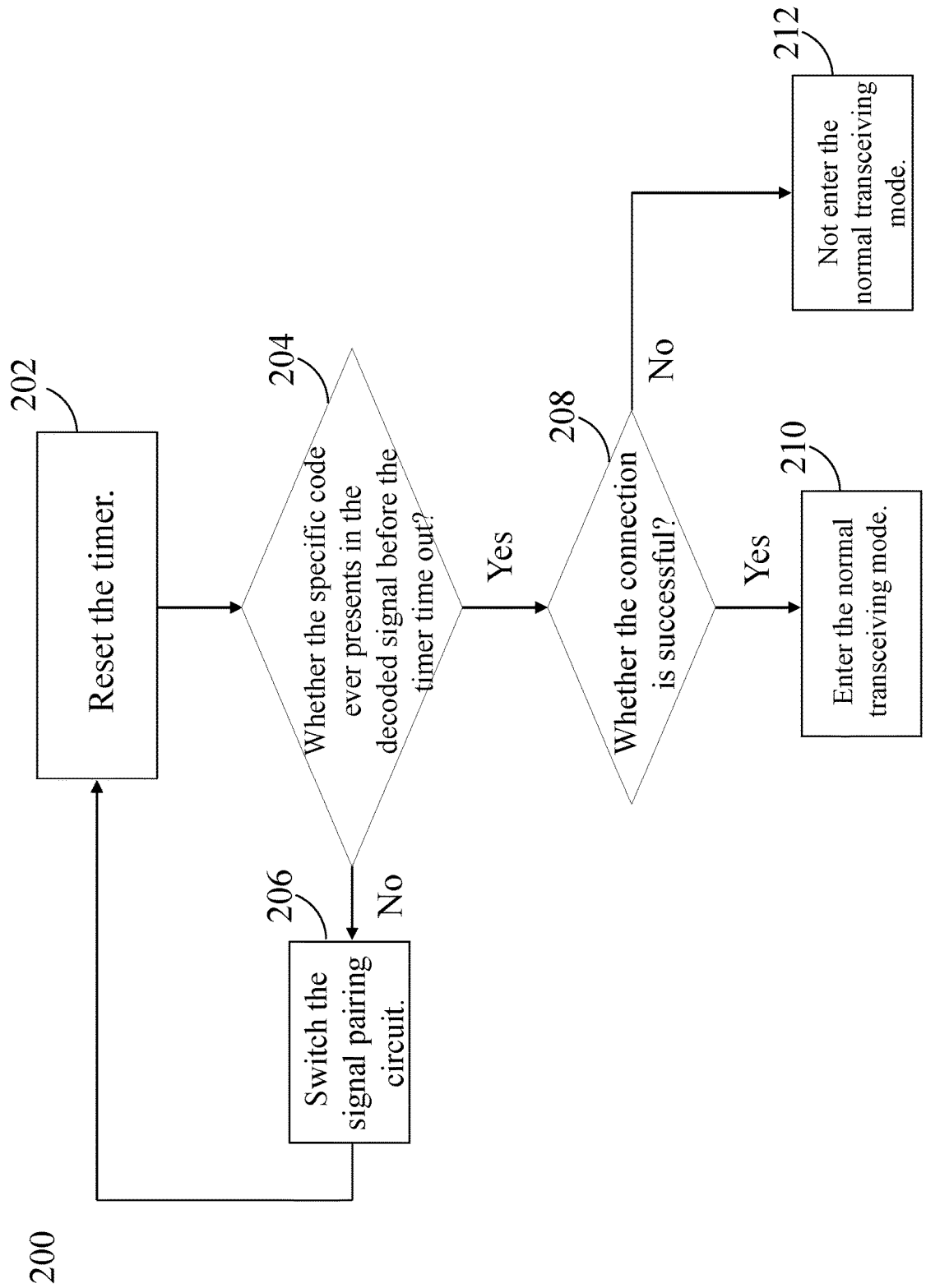
FIG. 2 is a flow chart of an associated method according to one embodiment of the present disclosure.

FIG. 2 is a flow chart of a method associated with the communication apparatus 103 according to one embodiment of the present disclosure. Specifically, the processor circuit 110 is configured to perform the method 200 to control the communication apparatus 103. In Step 202, the processor circuit 110 resets the timer to a specific status; for example, the timer is reset to zero and then start timing, and after a predetermined time period, the timer will send out a time out notification.

Generally speaking, in a communication protocol, some specific defined codes must appear intermittently to facilitate communication between the two parties who want to communicate. If the positive input port RP and the negative input port RN are substantially electrically coupled to the negative output port TN and the positive output port TP, the communication apparatus 103 must not be able to correctly decode these specific codes. Therefore, the present disclosure uses this characteristic as a judgment basis, and selects one or more groups of specific codes as the target in advance. For 8b/10b encoding, K28.5 is a common specific code used for character alignment and expression of idle mode. Since it is impossible to not receive K28.5 for a long time under normal circumstances, K28.5 is suitable to be used by the processor circuit 110 to determine whether the mode of the signal pairing circuit 104 needs to be switched.

In Step 204, the processor circuit 110 determines whether the specific code ever presents in any of the decoded signal DD received from the decoder circuit 108 in the duration between the timer reset and the timer time out. For example, the processor circuit 110 will continuously compare whether there is a match between the decoded signal DD and the specific code before the timer is time out, and if no specific code is found in the decoded signal DD before the timer is time out, the method proceeds to Step 206. On the other hand, if the specific code is found in the decoded signal DD before the timer is time out, then the method proceeds to Step 208. It should be noted that the specific code of the present embodiment can be a group of defined codes selected from the communication protocol or multiple groups of defined codes selected from the communication protocol, and the multiple groups of defined codes can be contiguous or incontiguous.

Specifically, when entering into Step 206, if the signal pairing circuit 104 operates in the first mode, then, after entering into Step 206, the processor circuit 110 will switch the signal pairing circuit 104 from the first mode to the second mode; on the other hand, when entering into Step 206, if the signal pairing circuit 104 operates in the second mode, then, after entering into Step 206, the processor circuit 110 will switch the signal pairing circuit 104 from the second mode to the first mode. After exiting Step 206, the method returns to Step 202, and uses the switched signal pairing circuit 104 to repeat Step 204.

In this embodiment, the processor circuit 110 simultaneously performs the connection when receiving the decoded signal DD. As mentioned above, entering Step 208 indicates that the specific code is successfully found in the decoded signal DD before the timer is time out. In Step 208, the processor circuit 110 further determines whether the connection between the communication apparatus 103 and the other communication apparatus 101 is successful. If the connection is successful, the method proceeds to Step 210; in Step 210, the processor circuit 110 keeps the signal pairing circuit 104 in the current mode, and makes the communication apparatus 103 enter the normal transceiving mode. If the connection is not successful, it means that there are other problems, so that the communication apparatus 103 and the other communication apparatus 101 cannot be connected smoothly. In this case, the method proceeds to Step 212, in step 212, the processor circuit 110 does not allow the communication apparatus 103 to enter the normal transmission and reception mode. Since it can be known that there is no problem with the mode setting of the signal pairing circuit 104 after Step 204, in Step 212, the processor circuit 110 does not attempt to change the mode of the signal pairing circuit 104.

By using the signal pairing circuit 104 and its control mechanism, it is feasible to quickly identify and solve the issues that the positive and negative terminals of differential signals are reversed, thereby reducing the verification time and the cost of design modification in case of errors.

What is claimed is:
1. A communication apparatus, comprising:
differential input ports, configured to receive a differential signal from differential output ports of another communication apparatus via a transmission line;
a signal pairing circuit, configured to electrically couple the differential input ports to a receiving circuit, wherein when the signal pairing circuit operates in a first mode, a positive input port and a negative input port of the differential input ports are correspondingly electrically coupled to a positive input terminal and a negative input terminal of the receiving circuit, and when the signal pairing circuit operates in a second mode, the positive input port and the negative input port of the differential input ports are correspondingly electrically coupled to the negative input terminal and the positive input terminal of the receiving circuit;

the receiving circuit, configured to receive the differential
signal to generate a received signal;
a decoder circuit, configured to decode the received signal
to generate a decoded signal; and
a processor circuit, configured to:
reset a timer, determine whether the decoded signal
comprises a specific code before the timer is time
out, and generate a determination result; and
selectively switch according to the determination result
the signal pairing circuit from the first mode to the
second mode or from the second mode to the first
mode.

2. The communication apparatus of claim 1, wherein
when the signal pairing circuit operates in the first mode, and
the determination result indicates that before the timer is
time out, the decoded signal does not comprise the specific
code, the processor circuit is further configured to:
switch the signal pairing circuit from the first mode to the
second mode.

3. The communication apparatus of claim 2, wherein
when the signal pairing circuit operates in the first mode, and
the determination result indicates that before the timer is
time out, the decoded signal does not comprise the specific
code, the processor circuit is further configured to:
reset the timer; and
determine that whether the decoded signal comprises the
specific code before the timer is time out, when the
signal pairing circuit operates in the second mode.

4. The communication apparatus of claim 1, wherein
when the signal pairing circuit operates in the second mode,
and the determination result indicates that before the timer
is time out, the decoded signal does not comprise the specific
code, the processor circuit is further configured to:
switch the signal pairing circuit from the second mode to
the first mode.

5. The communication apparatus of claim 4, wherein
when the signal pairing circuit operates in the second mode,
and the determination result indicates that before the timer
is time out, the decoded signal does not comprise the specific
code, the processor circuit is further configured to:
reset the timer; and
determine whether the decoded signal comprises the
specific code before the timer is time out, when the
signal pairing circuit operates in the first mode.

6. The communication apparatus of claim 1, wherein the
processor circuit is further configured to:
determine whether a connection between the communication apparatus and the other communication apparatus is successful.

7. The communication apparatus of claim 6, wherein
when the signal pairing circuit operates in the first mode, and
the determination result indicates that the decoded signal
comprises the specific code before the timer is time out and
the connection between the communication apparatus and
the other communication apparatus is successful, the processor circuit is further configured to:
keep the signal pairing circuit in the first mode and enter
a normal transceiving mode.

8. The communication apparatus of claim 6, wherein
when the signal pairing circuit operates in the second mode,
and the determination result indicates that the decoded
signal comprises the specific code before the timer is time
out and the connection between the communication apparatus and the other communication apparatus is successful,
the processor circuit is further configured to:
keep the signal pairing circuit in the second mode and
enter a normal transceiving mode.

9. The communication apparatus of claim 6, wherein
when the signal pairing circuit operates in the first mode, and
the determination result indicates that the decoded signal
comprises the specific code before the timer is time out and
the connection between the communication apparatus and
the other communication apparatus is not successful, the
processor circuit is further configured to:
keep the signal pairing circuit in the first mode and not
enter a normal transceiving mode.

10. The communication apparatus of claim 6, wherein
when the signal pairing circuit operates in the second mode,
and the determination result indicates that the decoded
signal comprises the specific code before the timer is time
out and the connection between the communication apparatus and the other communication apparatus is successful,
the processor circuit is further configured to:
keep the signal pairing circuit in the second mode and not
enter a normal transceiving mode.

11. A method, for use in a communication apparatus,
wherein differential input ports of the communication apparatus receive a differential signal from differential output
ports of another communication apparatus via a transmission
line, the method comprising:
using a signal pairing circuit to electrically couple the
differential input ports to a receiving circuit of the
communication apparatus, wherein when the signal
pairing circuit operates in a first mode, a positive input
port and a negative input port of the differential input
ports are correspondingly electrically coupled to a
positive input terminal and a negative input terminal of
the receiving circuit, and when the signal pairing circuit
operates in a second mode, the positive input port and
the negative input port of the differential input ports are
correspondingly electrically coupled to the negative
input terminal and the positive input terminal of the
receiving circuit;
using the receiving circuit to receive the differential signal
to generate a received signal;
using a decoder circuit to decode the received signal to
generate a decoded signal;
resetting a timer;
determining whether the decoded signal comprises a
specific code before the timer is time out and generating a determination result; and
selectively switching the signal pairing circuit from the
first mode to the second mode or from the second mode
to the first mode, according to the determination result.

12. The method of claim 11, wherein selectively switching the signal pairing circuit from the first mode to the
second mode or from the second mode to the first mode
according to the determination result comprises:
switching the signal pairing circuit from the first mode to
the second mode, when the signal pairing circuit operates in the first mode and the determination result
indicates that the decoded signal does not comprise the
specific code before the timer is time out.

13. The method of claim 12, wherein selectively switching the signal pairing circuit from the first mode to the
second mode or from the second mode to the first mode
according to the determination result further comprises:
resetting the timer; and
determining whether the decoded signal comprises the
specific code before the timer is time out, when the
signal pairing circuit operates in the second mode.

14. The method of claim 11, wherein selectively switching the signal pairing circuit from the first mode to the second mode or from the second mode to the first mode according to the determination result comprises:

switching the signal pairing circuit from the second mode to the first mode, when the signal pairing circuit operates in the second mode, and the determination result indicates that the decoded signal does not comprise the specific code before the timer is time out.

15. The method of claim 14, wherein selectively switching the signal pairing circuit from the first mode to the second mode or from the second mode to the first mode according to the determination result further comprises:

resetting the timer; and determining whether the decoded signal comprises the specific code before the timer is time out, when the signal pairing circuit operates in the first mode.

16. The method of claim 11, further comprises:

determining whether a connection between the communication apparatus and the other communication apparatus is successful.

17. The method of claim 16, wherein selectively switching the signal pairing circuit from the first mode to the second mode or from the second mode to the first mode according to the determination result comprises:

keeping the signal pairing circuit in the first mode and entering a normal transceiving mode, when the signal pairing circuit operates in the first mode, and the determination result indicates that the decoded signal comprises the specific code before the timer is time out and the connection between the communication apparatus and the other communication apparatus is successful.

18. The method of claim 16, wherein selectively switching the signal pairing circuit from the first mode to the second mode or from the second mode to the first mode according to the determination result comprises:

keeping the signal pairing circuit in the second mode, and entering a normal transceiving mode, when the signal pairing circuit operates in the second mode, and the determination result indicates that before the timer is time out, the decoded signal comprises the specific code and the connection between the communication apparatus and the other communication apparatus is successful.

19. The method of claim 16, wherein selectively switching the signal pairing circuit from the first mode to the second mode or from the second mode to the first mode according to the determination result comprises:

keeping the signal pairing circuit at the first mode and not entering a normal transceiving mode, when the signal pairing circuit operates in the first mode, and the determination result indicates that the decoded signal comprises the specific code before the timer is time out and the connection between the communication apparatus and the other communication apparatus is not successful.

20. The method of claim 16, wherein selectively switching the signal pairing circuit from the first mode to the second mode or from the second mode to the first mode according to the determination result comprises:

keeping the signal pairing circuit at the second mode and not entering a normal transceiving mode, when the signal pairing circuit operates in the second mode, and the determination result indicates that the decoded signal comprises the specific code before the timer is time out and the connection between the communication apparatus and the other communication apparatus is successful.

\* \* \* \* \*